(12) United States Patent
Gonikberg (10) Patent No.: US 7,738,652 B2
(45) Date of Patent: *Jun. 15, 2010

(54) SYSTEM AND METHOD FOR PREVENTING TELEPHONE LINE BLOCKING BY A MODEM

(75) Inventor: Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1062 days.

This patent is subject to a terminal disclaimer.

(21) Appl. No.: 11/386,364

(22) Filed: Mar. 21, 2006

(65) Prior Publication Data

US 2006/0182264 A1    Aug. 17, 2006

Related U.S. Application Data (63) Continuation of application No. 10/967,964, filed on Oct. 19, 2004, now Pat. No. 7,046,773, which is a continuation of application No. 09/949,911, filed on Sep. 10, 2001, now Pat. No. 6,895,085.

(51) Int. Cl.
*H04M 1/00* (2006.01)
(52) U.S. Cl. .............................. 379/376.01; 379/93.05; 379/387.01; 379/399.01
(58) Field of Classification Search ............ 379/93.05, 379/93.09, 93.14, 100.05, 100.15, 350, 372, 379/387.01

See application file for complete search history.

(56) References Cited

U.S. PATENT DOCUMENTS

| | | | | | |
|---|---|---|---|---|---|
| 4,852,151 | A | * | 7/1989 | Dittakavi et al. | 379/93.35 |
| 6,351,781 | B1 | * | 2/2002 | Gracias et al. | 710/22 |
| 6,895,085 | B2 | * | 5/2005 | Gonikberg | 379/93.28 |
| 7,046,773 | B2 | * | 5/2006 | Gonikberg | 379/93.28 |

* cited by examiner

*Primary Examiner*—Walter F Briney, III
(74) *Attorney, Agent, or Firm*—Garlick Harrison & Markison; Bruce E. Garlick; James A. Harrison (57) ABSTRACT

A modem includes modem circuitry and modem software that is executed by a processor. When the modem circuitry detects that the modem software is nonfunctional, it enters an on-hook state to prevent blocking of a coupled telephone line. A nonfunctional state of the modem software is detected when the modem software ceases to interact with the modem circuitry in an expected manner. In a first operation, the nonfunctional state is determined when the modem software does not reset a count down timer in the modem circuitry before the count down timer reaches a termination value. In a second operation, the nonfunctional state is determined when the modem software does not access the modem circuitry before the count down timer reaches the termination value. In a third operation, the nonfunctional state is determined when the modem software ceases writing transmit data to DMA memory.

22 Claims, 11 Drawing Sheets

SYSTEM AND METHOD FOR PREVENTING TELEPHONE LINE BLOCKING BY A MODEM

CROSS REFERENCE TO RELATED APPLICATION

This application is a continuation of U.S. patent application Ser. No. 10/967,964, filed Oct. 19, 2004, and now issued as U.S. Utility Pat. No. 6,895,085, which is a continuation of U.S. patent application Ser. No. 09/949,911, filed Sep. 10, 2001 and now issued as U.S. Utility Pat. No. 6,895,085, both of which are incorporated herein by reference in their entirety.

FIELD OF THE INVENTION

This invention relates generally to wired communications; and more particularly to modem based communications.

BACKGROUND OF THE INVENTION

The public switched telephone network (PSTN) is a network of circuit switched equipment and data communication paths that intercoupling circuit switched equipment. The PSTN was initially constructed to service solely voice communications. However, the PSTN was later called upon to service data communications as well. Data communications are now commonly serviced across the PSTN by electronic devices called modems (modulator/demodulator).

The structure and operation of modems is generally well known. Modems couple digital data onto an analog carrier that operates within the frequency bandwidth supported by the PSTN. Current modem technology supports data rates up to approximately 56 Kbps. Modems typically service computers, FAX machines, set top boxes, and other digital devices that require data communication service. In its operation, a modem couples, via the PSTN, to another modem and establishes a communication with the other modem. However, each of these modems services its host device, e.g., host computer, FAX machine, set top box, etc.

As contrasted to packet switched communication networks, e.g., LANs, WANs, Intranets, the Internet, etc., modems service point-to-point circuit-switched communications upon which packet-switched data communications may ride. In one particular modem application, a computer having a modem coupled thereto establishes a communication link across the PSTN with a modem of an Internet Service Provider (ISP). The ISP provides data networking service, e.g., access to the Internet for the computer. The communication link therefore services a data session between the computer and other computers to which the computer may couple via the ISP.

When the modem is not servicing a communication link, it presents an "on-hook" state to the coupled twisted pair of wires that services a local loop to the Central Office (CO) of a servicing telephone network. In the on-hook state, the modem (by a digital access arrangement "DAA Circuit") circuit of the modem presents high DC impedance across the twisted pair of wires. In the on-hook state, no current flows in the twisted pair of wires from the CO to the modem. In initiating access to the PSTN via the CO, the modem presents an "off-hook" state to the twisted pair of wires of the local loop. In the off-hook state, the modem presents low DC impedance across the twisted pair of wires and, resultantly, electrical current flows from the CO to the modem. The presence of this electric current flow is an indication to the CO that the telephone line is seized by the modem. Of course, at this time, the CO does not know what type of device has seized the telephone line.

Once the CO detects the off-hook state, the CO provides a dial tone to the modem across the twisted pair of wires. The modem detects this dial tone and determines that the CO is ready to accept number dialing. The modem then dials the number of a desired destination, e.g., telephone number of a modem bank of the ISP, and the CO collects the dialed digits. The CO then processes the call and routes the call to an endpoint corresponding to the telephone number, in this case a terminating modem of the modem band of the ISP. The modems initiate communication and service the data communication. When the data communication is complete, the DAA Circuit of the modem returns the modem to the on-hook state. At this time, the central office detects the lack of current flow to the modem and disables the communication by terminating the call.

Many modems now include modem software that is executed by a processor and a hardware device that is known as a Digital Access Arrangement (DAA) Circuit. The modem software may be executed by a processor resident on a modem card or by a processor resident in the host, e.g., a digital computer's processor. The DAA Circuit interfaces with the modem software via a digital interface and interfaces with the telephone line via an analog interface. With this modem structure, the modem software performs all modulation, demodulation, and control operations.

As is the case with most software, the modem software does not always properly execute and may become nonfunctional for some reason, e.g., modem card processor locks up, host processor locks up, host computer overwrites modem software, etc. When such an event occurs, the modem software becomes nonfunctional with respect to the DAA Circuit. If this happens during modem communication, i.e. when modem is in the off-hook state, the DAA Circuit, not knowing that the modem software is not functioning properly, remains in the off-hook state indefinitely. The telephone line that services the modem is also used for voice communications, FAX communications, set top box communications, and other communications. Thus, when the modem software becomes nonfunctional, the DAA Circuit blocks the telephone line so that the telephone line is unavailable to these other devices.

Heretofore, these operational difficulties have not been solved. Thus, there is a need in the art for a methodology to prevent a modem from blocking the telephone line.

SUMMARY OF THE INVENTION

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
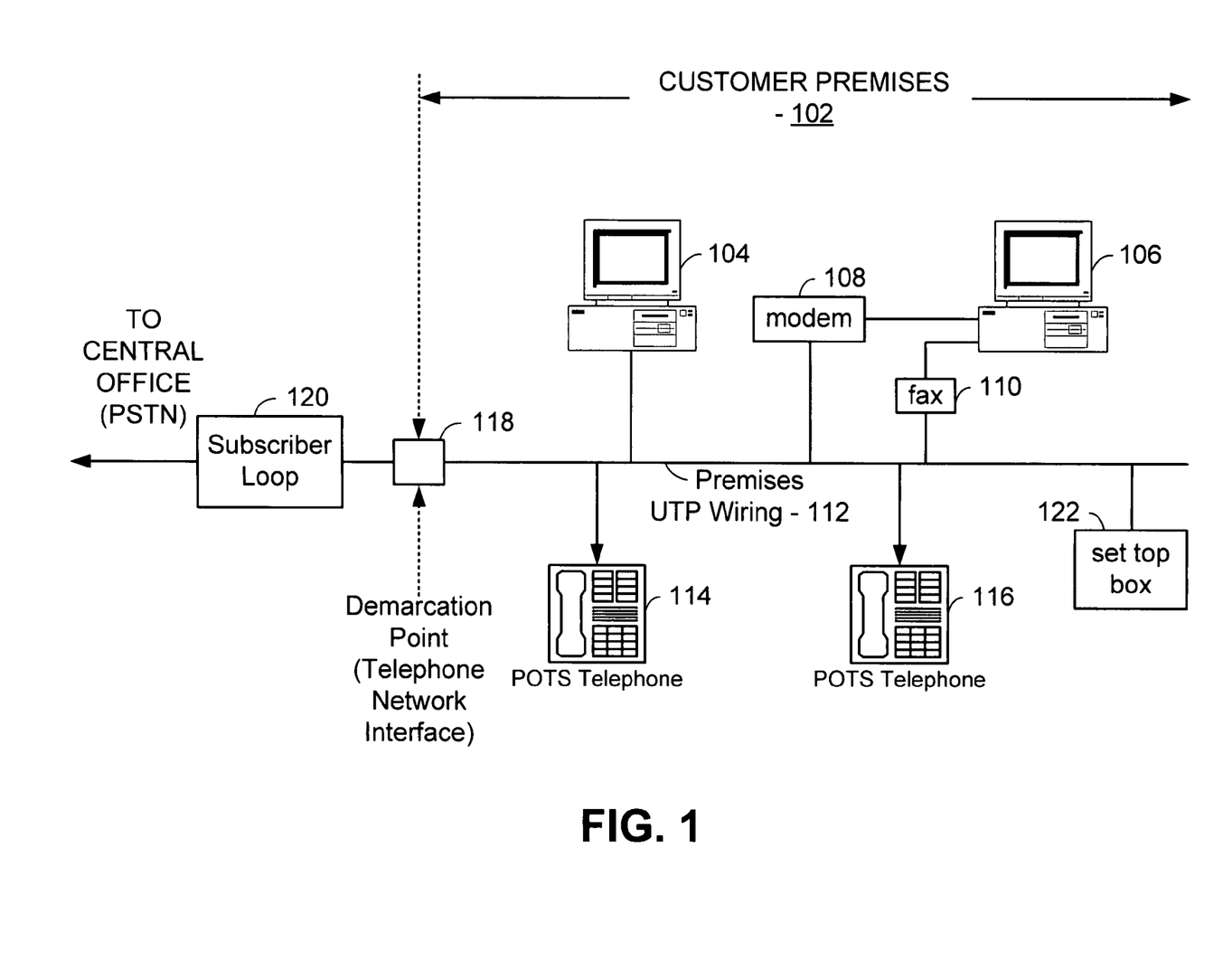
FIG. 1 is a system diagram illustrating a customer premises within which devices that operate according to the present invention are deployed.

FIG. 1 is a system diagram illustrating a customer premises 102 within which devices that operate according to the present invention are deployed. Computers 104 and 106, external modem 108, FAX 110, set top box 122, and Plain Old Telephone System (POTS) telephones 114 and 116 all reside within the customer premises 102 and couple to premises unshielded twisted pair (UTP) wiring 112. The premises wiring 112 couples to the Central Office (CO) of a telephone service provider via a subscriber loop 120. The subscriber loop couples to the premises wiring 112 at a demarcation point 118 that may be a termination block residing on an external wall of the customer premises 102. With this arrangement, each of the computers 104 and 106, external modem 108, FAX 110, set top box 122, and Plain Old Telephone System (POTS) telephones 114 and 116 may share a single telephone line using the premises wiring 118.

Computer 102 includes a modem that couples to the premises wiring 112. With this structure, the modem of computer 104 communicates via the premises wiring 112 and the PSTN (subscriber loop 120, CO, other lines, etc.) with another modem. For example, the modem of computer 104 may communicate using this communication path with a modem of an Internet Service Provider (ISP). When the subscriber uses computer 104 to initiate a data session with its ISP, the modem of computer 104 establishes a connection to the ISP's modem. The modem of computer 104 may be used to establish communication links with other devices using modems, e.g., other computers, FAX machines, etc.

The other devices illustrated also use the premises wiring 112 to access the PSTN. The fax 110 includes a modem and uses the premises wiring 112 to access other fax machines via the PSTN. The POTS telephones 114 and 116 use the premises wiring 112 to communicate with other telephones and other devices across the PSTN. Further set top box 122 includes a modem and uses the premises wiring 112 to access its service provider location to receive instructions on how to operate. Other types of devices not shown in FIG. 1 may also use the premises wiring 112 to access the PSTN.

At any time, one of these devices 104, 106, 108, 110, 114, 116, and 122 may access the PSTN via the premises wiring 112 and establish a communication with a remote device. When one of these devices has accessed the PSTN via the premises wiring 112, the other devices coupled to the premises wiring 112 are blocked from PSTN access. Thus according to the present invention, the modem of computer 104, external modem 108, a modem of FAX 110, and a modem of set top box 122 each operates so that it does not block access to the PSTN when modem software operating thereon becomes nonfunctional. Each of these modems detects when its modem software becomes nonfunctional and, in such case, the modem places itself in an on-hook state. As will be described further with reference to FIGS. 3 through 9, various methodologies and structures may be employed to determine when the modem software becomes nonfunctional.

Figure 2:
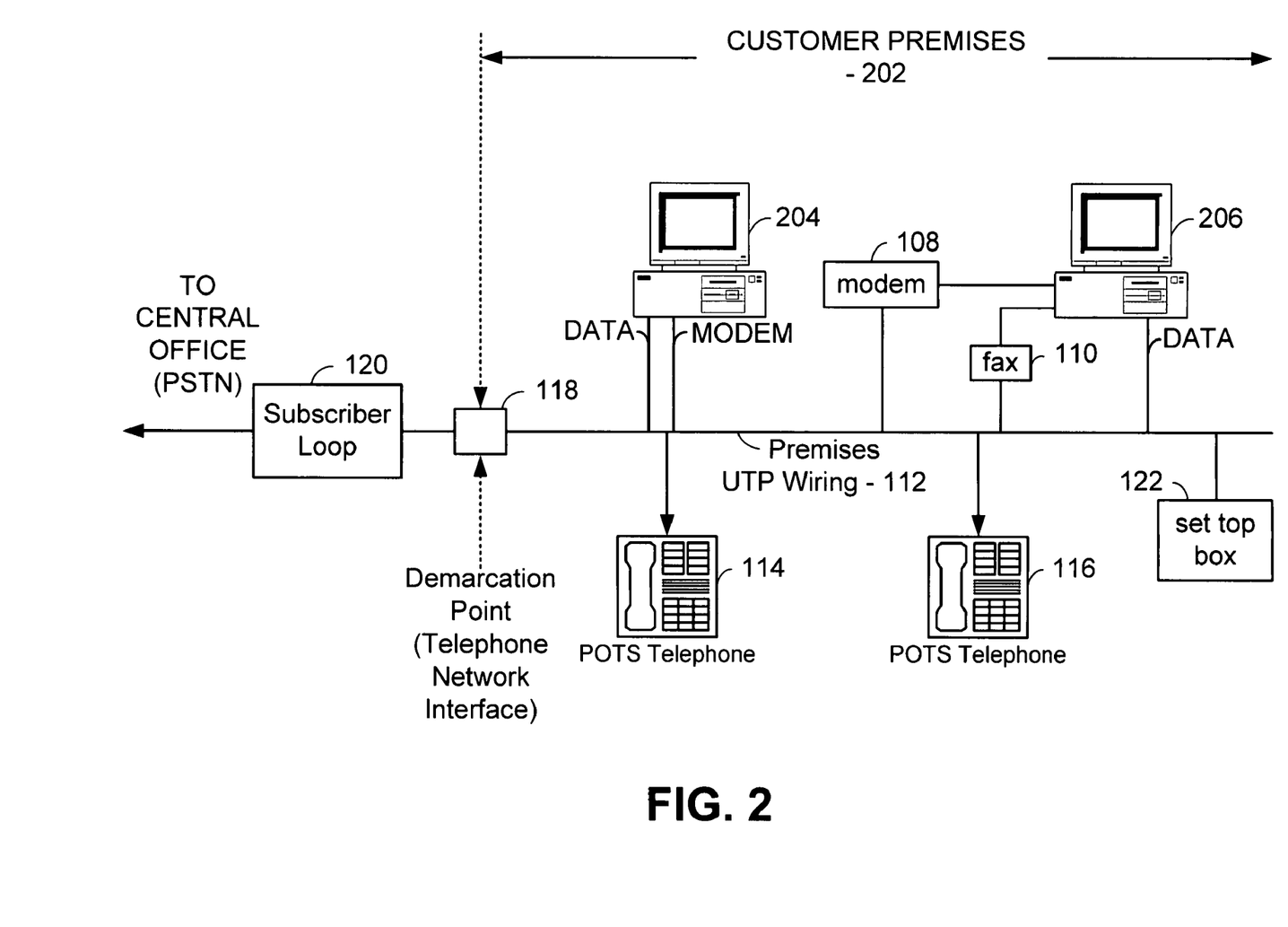
FIG. 2 is a system diagram of an alternate embodiment of a customer premises within which devices that operate according to the present invention are deployed.

FIG. 2 is a system diagram of an alternate embodiment of a customer premises within which devices that operate according to the present invention are deployed. The system of FIG. 2 employs the principles of the present invention as described with reference to FIG. 1. Those components illustrated in FIG. 2 that have the same functions and operations as the components illustrated in FIG. 1 retain common numbering. In such case, the external modem 108, the FAX 110, the premises wiring 112, the POTS telephones 114 and 116, the demarcation point 118, the subscriber loop 120, and the set top box 122 are similar to/the same as the commonly numbered elements of FIG. 1.

The differences described with reference to FIG. 2 relate to the use of the premises wiring 112 for digital communications. These digital communications are serviced according to a digital networking standard such as the HomePNA 1.0 standardized operations (Home Network). These operating standards set forth device-to-device data communication standards that employ the premises wiring 112. In the customer premises 202 of FIG. 2, computer 204 services both Home Network communications and modem communications, both of which use the premises wiring 112. Further, computer 206 also services Home Network communications that use the premises wiring 112. While modem communications are serviced by the PSTN via the subscriber loop 120, the Home Networking communications remain within the customer premises 202. In some installations, the demarcation point 118 may include circuitry that contains the Home Network signals within the customer premises 202.

According to the present invention, the modems of computer 204, external modem 108, FAX 110, and set top box 122 determine when their respective modem software becomes nonfunctional with respect to an ongoing serviced data communication. When a nonfunctional state of the modem software is determined, the respective modem enters the on-hook state. These operations are described further and with respect to FIGS. 3 through 9.

Figure 3A:
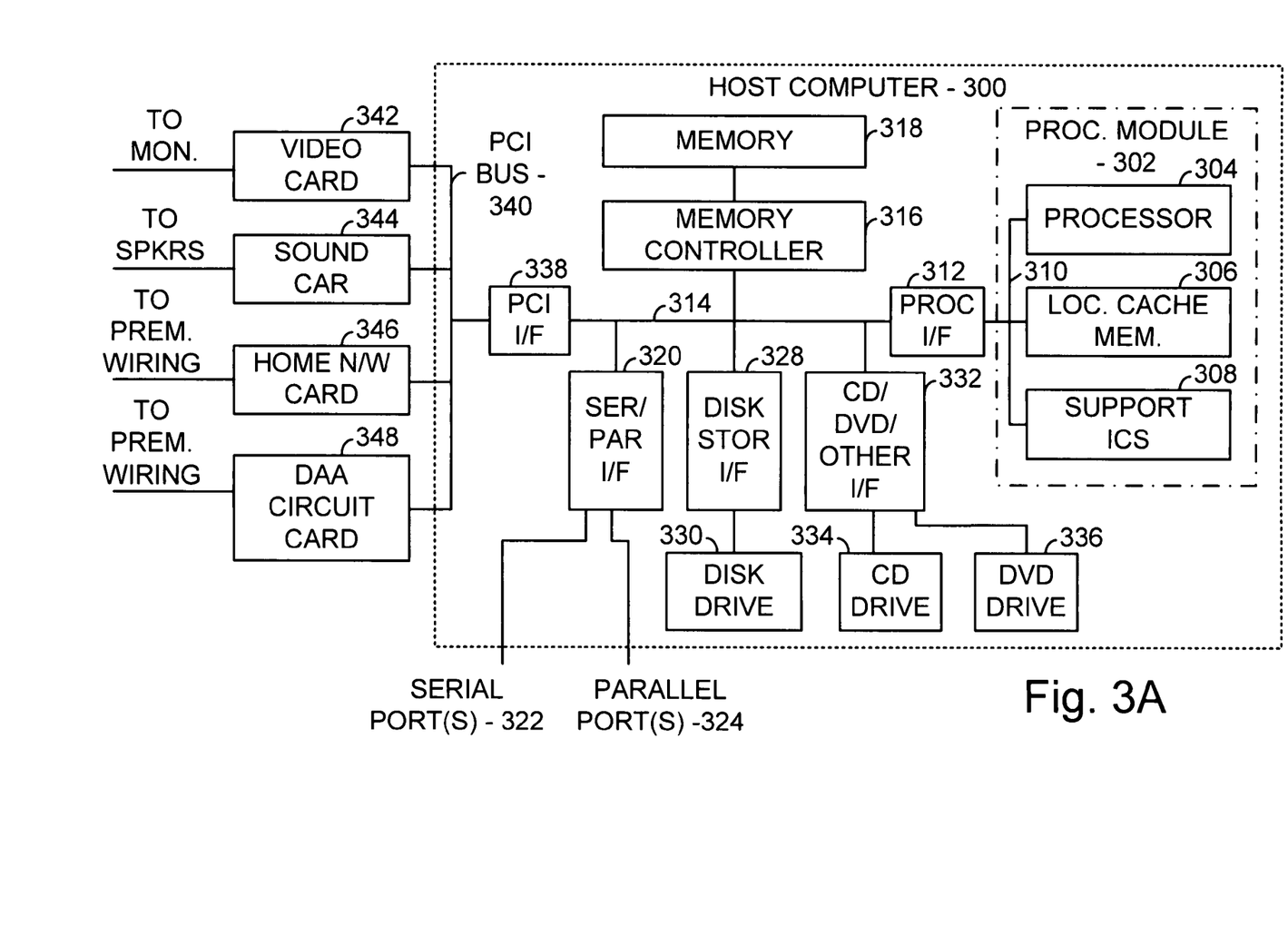
FIG. 3A is a block diagram of a host computer (modem software running on host) that incorporates the teachings of the present invention.

FIG. 3A is a block diagram of a host computer that incorporates the teachings of the present invention. The host computer 300 shown in FIG. 3A may correspond to computer 204 of FIG. 2 or computer 104 of FIG. 1. Further, the host computer 300 shown in FIG. 3A may also correspond to computer 106 of FIG. 1 or computer 206 of FIG. 2 but without all of the components shown herein. Some of the components of FIG. 3A also may correspond to the FAX machine and/or set top boxes 122 of FIGS. 1 and 2. The host computer 300 of FIG. 3A implements a modem that accesses a coupled telephone line, e.g., the premises wiring 112 of FIG. 1 or 2.

The host computer 300 includes a processing module 302 that includes a processor 304, a local cache memory 306, and other supporting integrated circuits 308. These components 304, 306, and 308 couple to a processor interface 312 via a processor bus 310. The processor 304 within the host computer 300 is a microprocessor such as an Intel, Sun, Motorola, AMD, or another type of microprocessor. However, another type of processor such as a digital signal processor, communications processor, or other processor type may also be employed with the present invention.

The processor interface 312 couples to a system bus 314 that in turn couples to a PCI interface 338. A memory controller 316 couples the system bus 314 to main memory 318. Main memory 318 may be random access memory such as DRAM or another type of memory that can be used as main memory by the host computer 300. Also coupled to system bus 314 are a serial/parallel interface 320, a disk storage interface 328, and a CD/DVD/other type of interface 332. The serial/parallel interface 320 couples the system bus 314 to serial ports 322 and to parallel ports 324. In the system 200 of FIG. 2 and the system 100 of FIG. 1, computers are shown that couple to an external modem 108. In such case, external modem 108 may couple to its respective host via either a serial port 322 or a parallel port 324. Disk drive 330 couples to system bus 314 via the disk storage interface 328. CD drive 334 and DVD drive 336 couple to the system bus 314 via the CD/DVD/other interface 332. Of course, other devices could also couple to the host computer 300 via other interface devices and/or via the main system bus 314.

The PCI interface 338 is an expansion bus interface that services PCI bus 340. The PCI bus 340 is a standardize bus interface that allows vendors to sell interface and expansion cards that may be simply connected to the host computer 300. However, in other embodiments, other expansion bus types may be used, e.g., ISA, EISA, etc. Further, other types of interfaces and buses may also be used to service expansion cards in external modems, fax machines, etc. For example, the AC-97 standard may be employed with the host computer 300 of FIG. 3A to support audio communications, modem communications, etc.

The expansion cards shown in host computer 300 include a video card 342, a sound card 344, a home networking card 346, and a DAA Circuit card 348. The video card 342 couples to a video monitor to display images produced by the host computer 300. The sound card 344 provides an audio interface to the host computer 300, couples to speakers, and may couple to a microphone. The home network card 346 supports a Home Network communications. The DAA Circuit card 348 includes a DAA Circuit that, in conjunction with modem software executed by the processor 304, supports modem data communications between the host computer 300 and another modem. The DAA Circuit card 348 communicates with the host computer 300 according to the PCI interface standard.

The functions performed by video card 342, the sound card 344, the home networking card 346, and the DAA Circuit card 348 may also be provided by integrated circuits that are contained on the motherboard of the host computer 300. In such case, the integrated circuits that perform the video, audio, home networking, and DAA Circuit functions would not reside within an expansion card slot. Further, the sound card 344 and the DAA Circuit card 348 (or separate components that form the same functions) may couple to the host bus 314 via the AC-97 interface standard, another interface standard, or a proprietary interface. The teachings of the present invention apply to these other embodiments as well.

Figure 3B:
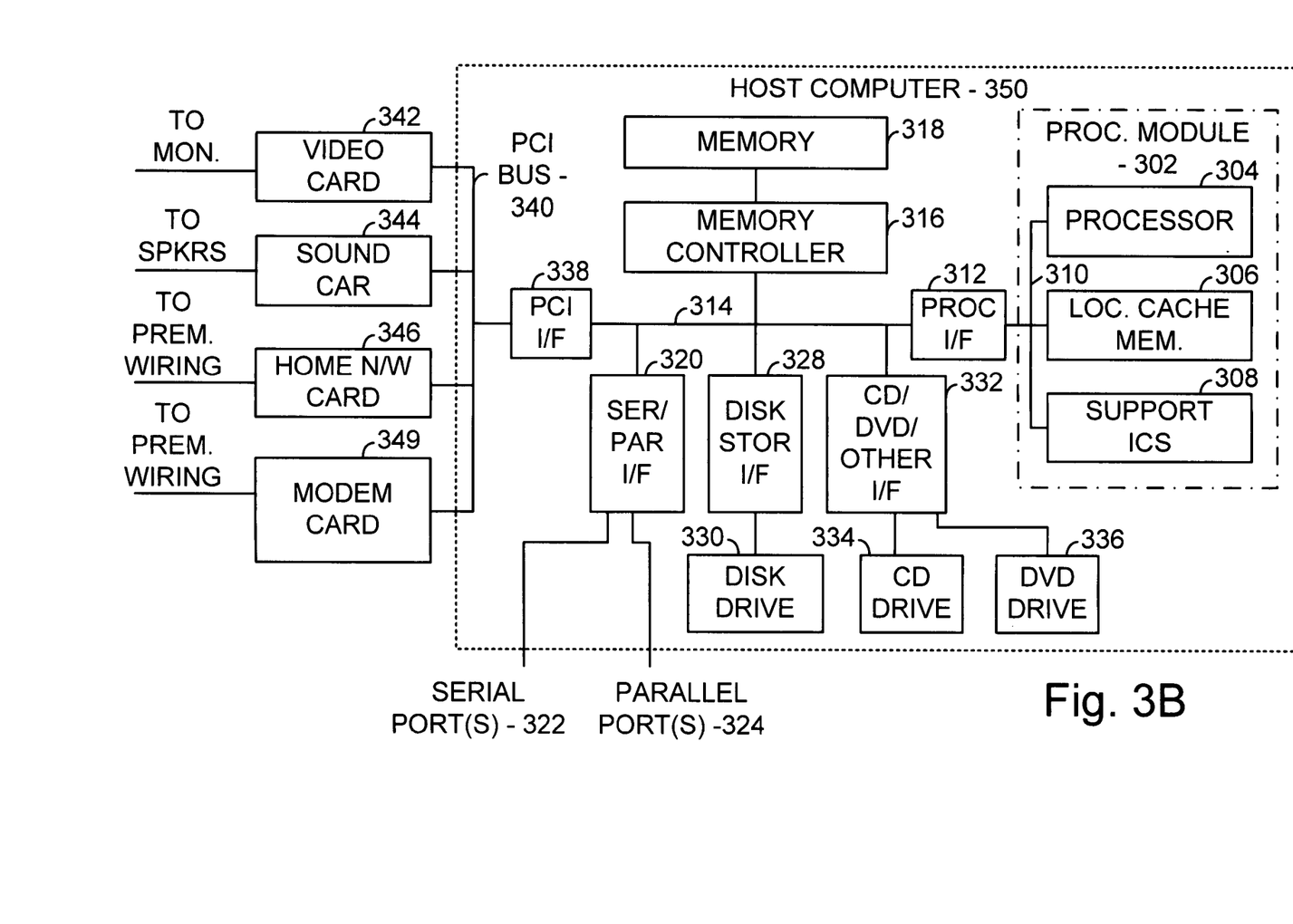
FIG. 3B is a block diagram of another host computer (modem software running on modem card) that incorporates the teachings of the present invention.

FIG. 3B is a block diagram of another host computer (modem software running on modem card processor) that incorporates the teachings of the present invention. The host computer 350 of FIG. 3B is similar in structure and function to the host computer 300 of FIG. 3A and includes the same components. However, the host computer 350 of FIG. 3B couples to a modem card 349 via the PCI bus 340 instead of the DAA Circuit card 348 of FIG. 3A. The modem card 349 of FIG. 3B performs more processing functions than does the DAA Circuit card 348 of FIG. 3A and may execute some or even all of the modem software.

Figure 4A:
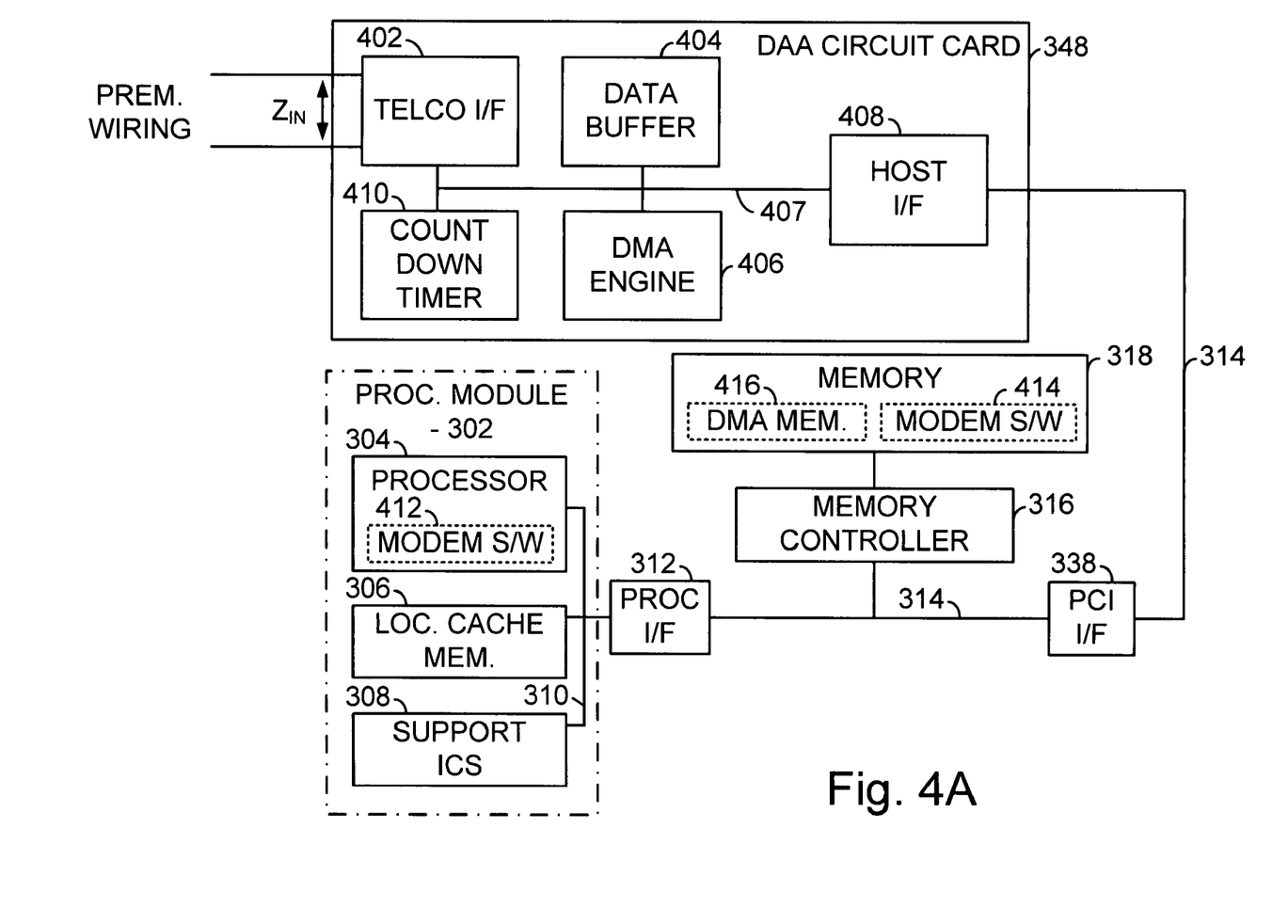
FIG. 4A is a block diagram illustrating a portion of a host device that incorporates the teachings of the present invention.

FIG. 4A is a block diagram illustrating a portion of a host device that incorporates the teachings of the present invention. The components of FIG. 4A generally correspond to the host computer 300 of FIG. 3A and elements common to both FIG. 4A and FIG. 3A retain common numbering convention. As shown in FIG. 4A, the DAA Circuit card 348 includes a Telephone Company (TELCO) interface 402, a data buffer 404, a Direct Memory Access (DMA) engine 406, and a PCI interface 408 that couple via DAA Circuit card bus 407. The DAA Circuit card 348 operates in conjunction with modem software running on the host to implement a modem. The DAA Circuit card 348 interfaces with the host via the PCI interface 408. In the illustrated embodiment, communications between the DAA Circuit card 348 and the host occur according to the PCI interface standard. However, in other embodiments, these communications are supported according to the AC-97 or another interface standard.

The TELCO interface 402 couples to the CO of the PSTN via the premises wiring 112, demarcation point 118, and subscriber loop 120. The TELCO interface 402 presents impedance $Z_{IN}$ to the CO of the PSTN. When the DAA Circuit card 348 is in an off-hook state, the TELCO interface 402 presents low DC impedance $Z_{IN}$ to the CO. However, in an on-hook state, the TELCO interface 402 presents high DC impedance $Z_{IN\ to\ the\ CO}$.

The TELCO interface 402 includes both A/D and D/A converters. In a transmit operation, the TELCO interface 402 receives digital modulated transmit data from the data buffer 404, converts the digital modulated transmit data into analog modulated transmit data, and transmits the analog modulated transmit data on the telephone line (premises wiring 112). Likewise, the TELCO interface 402 receives analog modulated receive data from the telephone line, converts the analog modulated receive data into digital modulated receive data, and passes the digital modulated receive data to the data buffer 404. The DMA engine 406 (via the PCI interface 408, PCI bus 314, PCI interface 338, host bus 314, and memory controller 318) reads digital modulated transmit data from the DMA memory 416 and writes digital modulated receive data to the DMA memory 416.

Modem software running on the host computer 300 controls the operation of the DAA Circuit card 348. The modem software is initially stored in a hard drive 328 but, upon its execution, the modem software is loaded into memory (modem software 414) and then executed by the processor 304 (modem software 412). When the host computer 300 establishes a data communication, the modem software 412 running on the host computer 300 directs the DAA Circuit card 348 to access the PSTN via the premises wiring 112.

In initiating access to the PSTN, the DAA Circuit card 348 goes into the off-hook state thereby presenting low impedance to the CO via the premises wiring 112, the demarcation point 118, and the subscriber loop 120. When the DAA Circuit card 348 presents this low impedance to the CO, the CO detects an electric current flow to the DAA Circuit card 348 and determines that the telephone line has been seized. The CO then provides a dial tone signal to the DAA Circuit card 348 and the modem software 412 (via the DAA Circuit card 348) initiates dialing to a desired terminating modem. The modem software 412 (via the DAA Circuit card 348) establishes the call via the PSTN to the remote modem. Once this call has been routed and terminated by the PSTN, the modem then negotiates with the remote modem for data rates and other operational parameters. Once the negotiation has been completed, a data session is established between the host computer 300 and a computer serviced by the remote modem.

An example of such data session occurs when the host computer 300 accesses its ISP via its modem and a remote modem operated by the ISP. During the data session, the host computer 300 sends data to the remote modem via the modem and receives data via the modem. The data session is serviced by the DAA Circuit card 348 until the modem software 412 of the host computer 300 or the remote modem terminates the data session.

Should the modem software 412 running on the host computer 300 become nonfunctional with respect to the DAA Circuit card 348 during the data session, the DAA Circuit card 348 initiates operations according to the present invention to terminate the communication with remote modem. The DAA Circuit card 348 detects a nonfunctional state of the modem software 412 when the modem software 412 fails to properly interact with the DAA Circuit card 348. When the DAA Circuit card 348 detects that the modem software 412 has become nonfunctional, the DAA Circuit card 348 places itself (the TELCO interface 402) in an on-hook state. In this on-hook state, the DAA Circuit card 348 presents high DC high impedance to the CO via the customer premises wiring 112, the demarcation point 118, and the subscriber loop 120. The CO then releases the telephone line. With the telephone line released, other devices coupled to the premises wiring 112 may then access the telephone circuit.

Figure 4B:
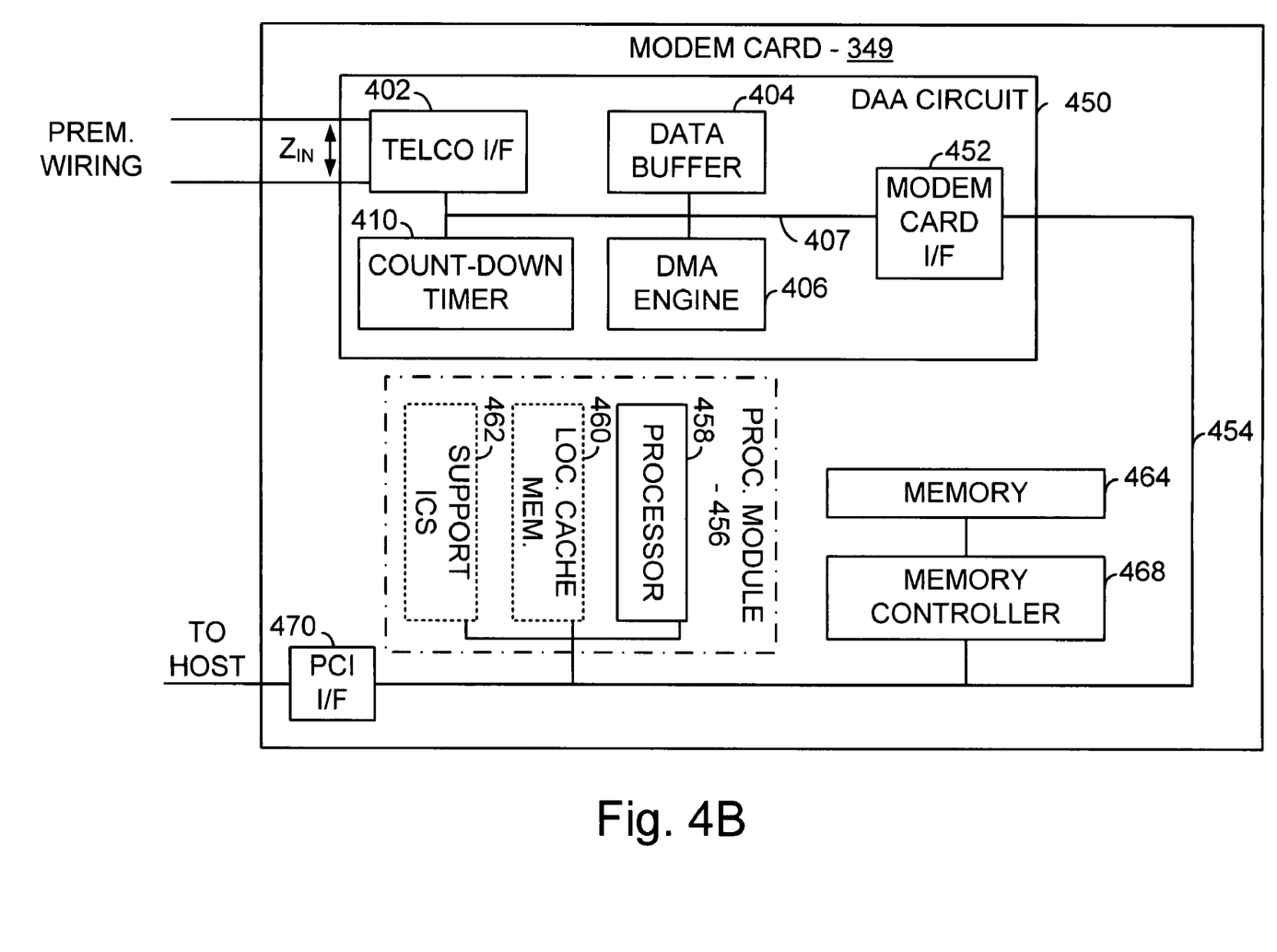
FIG. 4B is a block diagram illustrating a modem card that incorporates the teachings of the present invention.

FIG. 4B is a block diagram illustrating a modem card 349 that incorporates the teachings of the present invention. Those elements shown in FIG. 4B that have common numbering with respect to the elements of FIGS. 3B and 4A have the same or similar functions as such common numbered elements and are not described further with reference to FIG. 4B. The modem card 349 includes a DAA Circuit 450 that includes a TELCO interface 402, a data buffer 404, a DMA engine 406, a DAA Circuit bus 407, a count down timer 410, and a modem card interface 452. The DAA Circuit 450 interfaces with other components of the modem card via a modem card bus 454.

A processor module 456 that includes a processor 458, optional local cache memory 460, optional support integrated circuits 462 couple to the modem card bus 454. In addition, coupling to the modem card bus 454 are a memory controller 468 that services memory 464. The modem card bus 454 couples to the host via PCI interface 470. The modem card 349 of FIG. 4B may execute some components or all of the modem software that operate according to the present invention.

The structures described with reference to FIGS. 3A, 3B, 4A, and 4B include elements that support three described embodiments of the present invention. These three embodiments are described in detail with reference to FIGS. 5, 6, 7, 8 and 9. Each of these three embodiments is implemented by the combination of a DAA Circuit and modem software that is executed on a processor. The DAA Circuit may be located on a motherboard, on a DAA Circuit card 348, on a modem card 349, or on another device. The modem software may be executed by the processor of a modem card, a host computer, a host external modem, a host FAX machine, a host set-top box, and/or another processor that executes the modem software.

Figure 5:
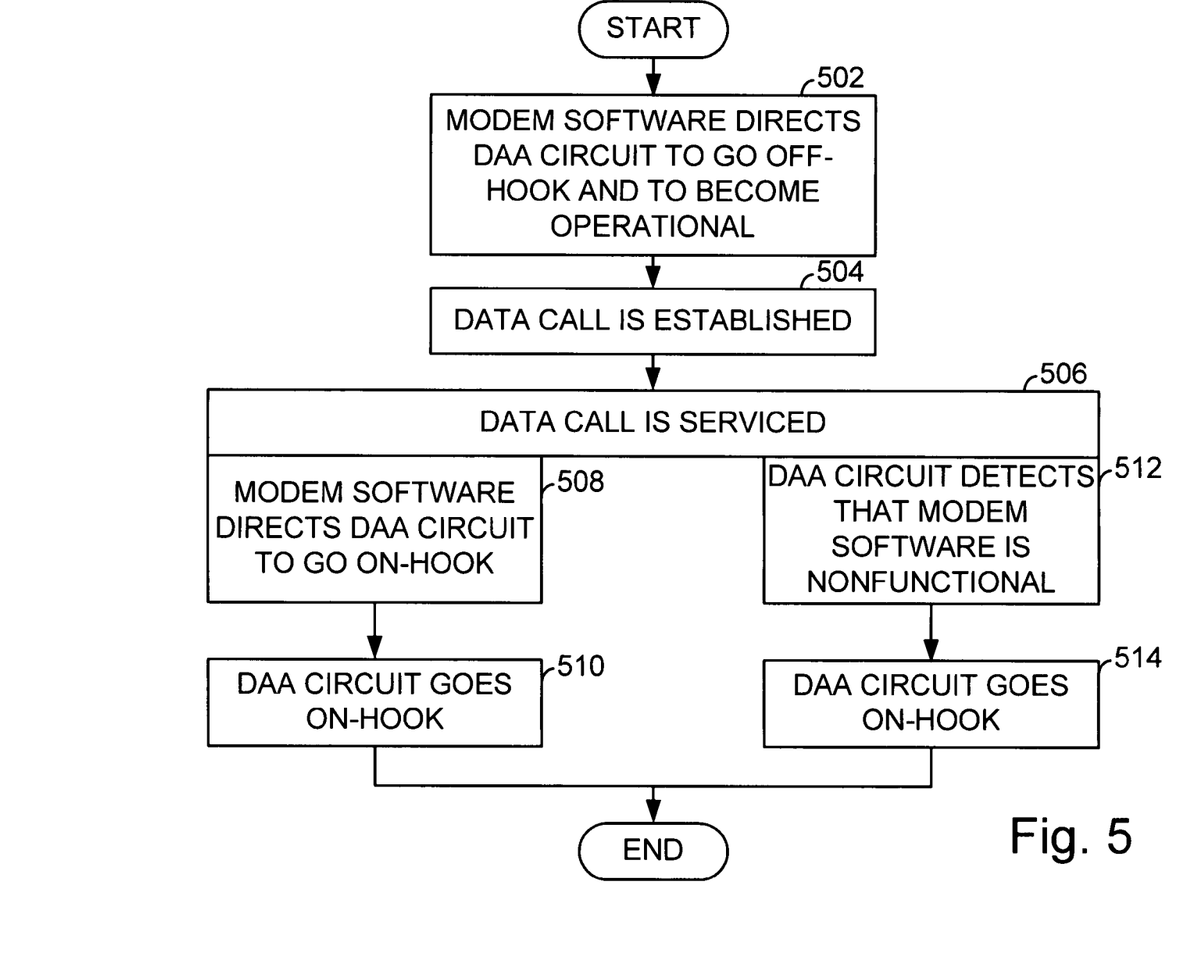
FIG. 5 is a logic diagram illustrating operation according to the present invention.

FIG. 5 is a logic diagram illustrating operation according to the present invention. Referring now to FIG. 5, the modem software 412 first directs the DAA Circuit 400 to go off-hook and become operational (step 502). Once DAA Circuit 400 goes off-hook, the modem software 412 establishes a data communication with a remote modem via the DAA Circuit 400, the premises wiring 112, and the PSTN (step 504). The manner in which the modem software and DAA Circuit 400 establish a data call with a remote modem is well known and is not described further herein except as to expand upon the teachings of the present invention. After establishment of the data call at step 504, the data call is serviced by the DAA Circuit 400 and the modem software 412 (step 506). While servicing the data call, the DAA Circuit 400 and modem software 412 use the communication link established between the DAA Circuit 400 and the remote modem to transmit and receive data. Operation remains at step 506 until one of two operations occurs.

In a first operation, the modem software 412 directs the DAA Circuit 400 to terminate the call (step 508). In response to this direction, the DAA Circuit 400 terminates the call by going to the on-hook state (step 510). In other embodiments, the modem software 412 may interact with the remote modem to initiate a shutdown procedure to release the remote modem before the DAA Circuit 400 goes to the on-hook state. From step 510, operation ends.

In a second operation from step 506, the DAA Circuit 400 detects that the modem software 412 has become nonfunctional (step 512). When the DAA Circuit 400 detects that the modem software 412 is nonfunctional at step 512, the DAA Circuit 400 terminates the call by going into the on-hook state (step 514). From step 514, operation also ends.

Figure 6:
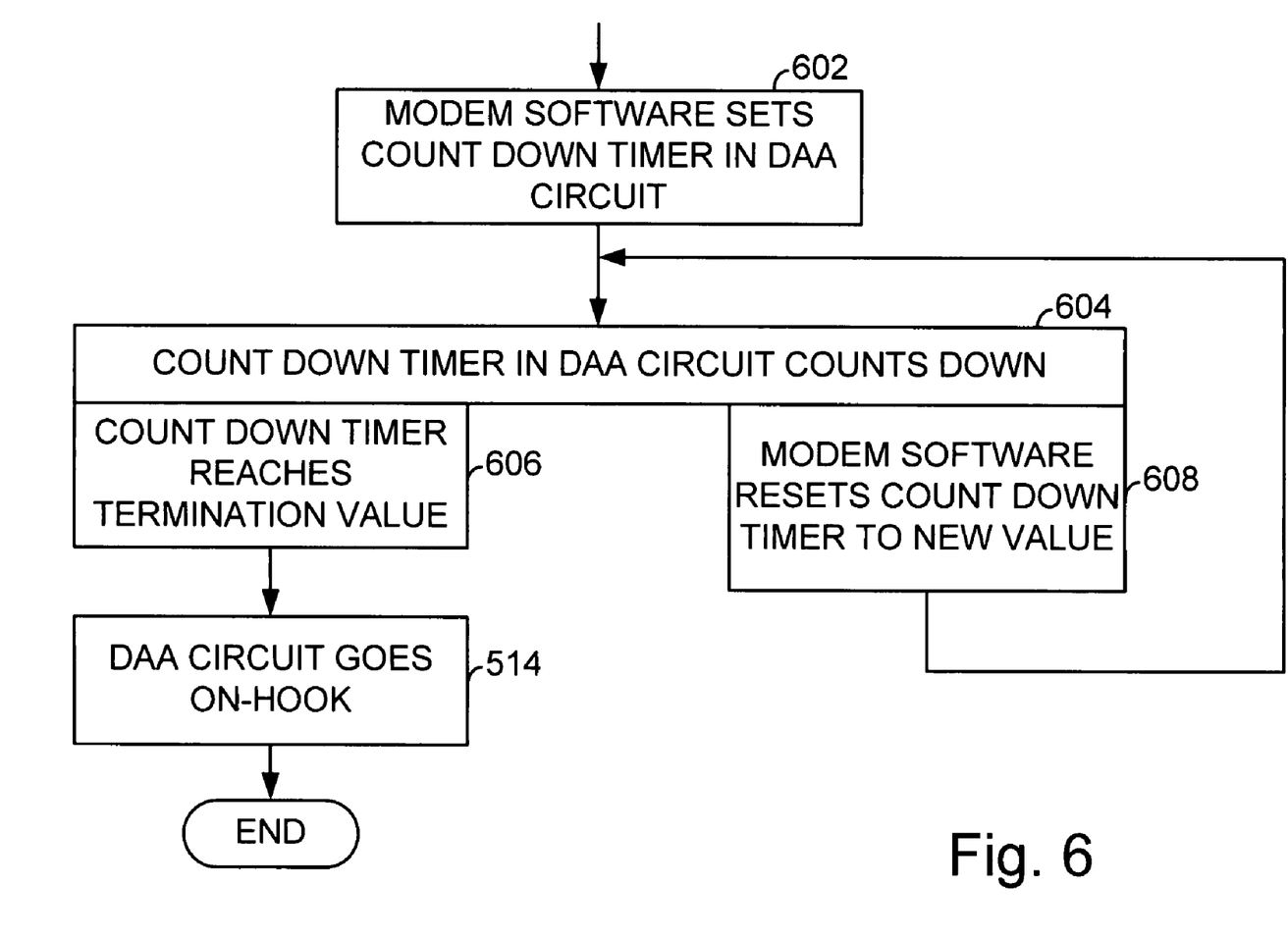
FIG. 6 is a logic diagram illustrating specific operations according to a first embodiment of the present invention.

FIG. 6 is a logic diagram illustrating specific operations according to a first embodiment of the present invention. According to the first embodiment of the present invention, the DAA Circuit 400 includes a count down timer 410, as shown in FIG. 4A. The count down timer 410 is implemented as a hardware component within the DAA Circuit 400. In the embodiment of FIG. 6, when a data call is established, the modem software 412 sets the count down timer 410 in the DAA Circuit 400 (step 602). After the count down timer 410 is initially set, operation proceeds to step 604 at which the DAA Circuit 400 counts down the value of the count down timer 410.

Should the count down timer 410 reach a termination value, e.g., zero, at step 606, the DAA Circuit 400 determines that the modem software 412 operating on the host is no functional with respect to the data call. Based on this determination, the DAA Circuit 400 terminates the call by transitioning to the on-hook state (step 514). Step 514 was previously described with respect to FIG. 5 and is the same operation. From step 514, operation ends.

During normal operations, when the modem software 412 is functional with respect to the data communication, it periodically resets the count down timer to a new/reset value (step 608). From step 608 operation returns to step 604 wherein the DAA Circuit 400 counts down the count down timer 410. Thus, according to the embodiment of FIG. 6, the DAA Circuit 400 determines that the modem software 412 is functional with respect to the data communication when it periodically accesses the count down timer 410 to reset the value of the count down timer. However, when the modem software 412 fails to access the count down timer 410 and reset it to a new value before it counts down to a termination value, the DAA Circuit 400 concludes that the modem software 412 is no longer functioning properly with respect to the DAA Circuit 400 and therefore terminates the call by transitioning to the on-hook state.

Figure 7:
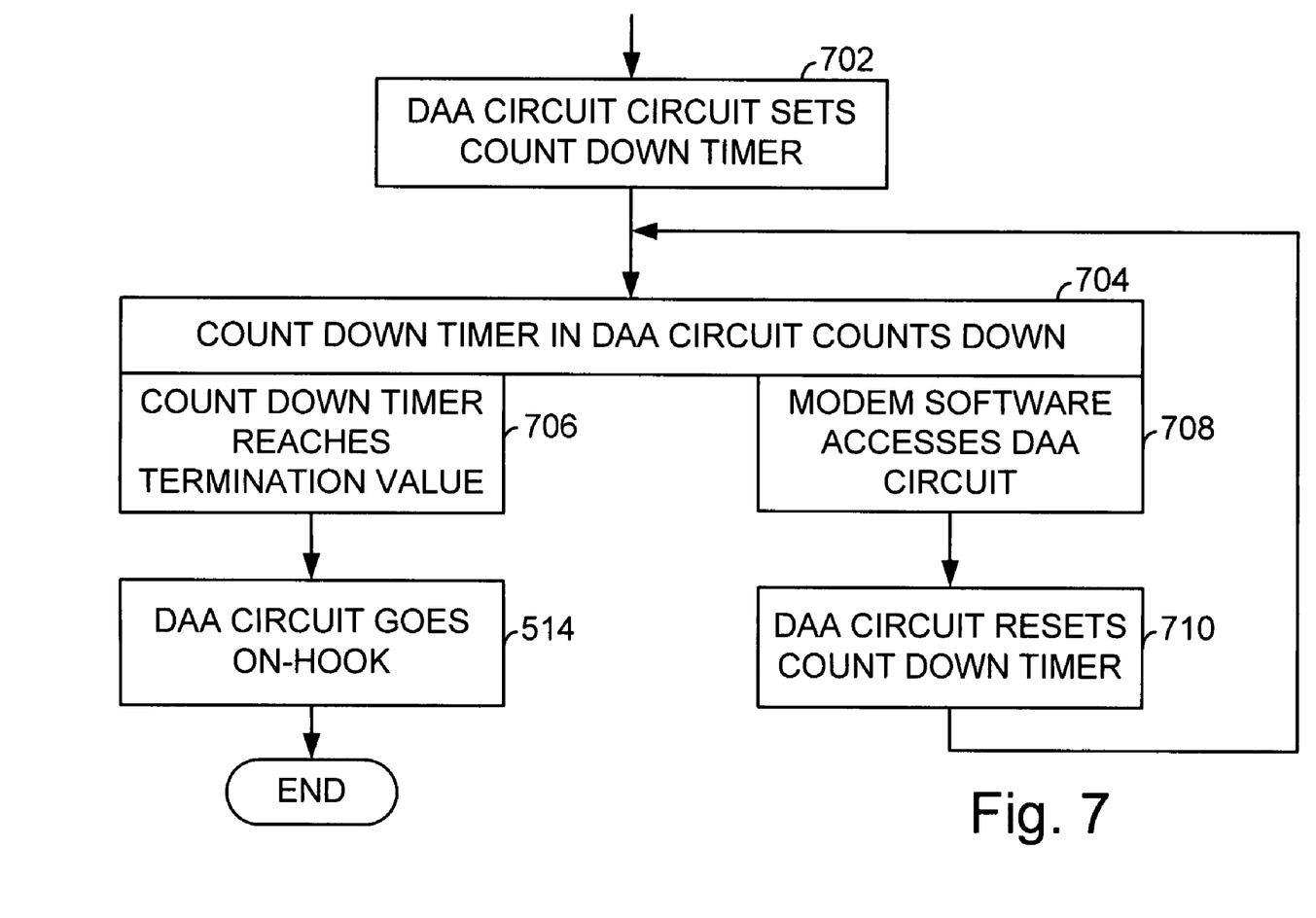
FIG. 7 is a logic diagram illustrating specific operations according to a second embodiment of the present invention.

FIG. 7 is a logic diagram illustrating specific operations according to a second embodiment of the present invention. The second embodiment of the present invention also includes a count down timer 410 that is located within the DAA Circuit 400. However, in the embodiment of FIG. 7, the modem software 412 does not access the count down timer 410. Instead, the DAA Circuit 400 itself initially sets the count down timer 410 to an initial value (step 702) and periodically resets the count down timer 410 to its initial/a reset value. However, the DAA Circuit 400 only resets the count down timer 410 when the modem software 412 accesses the DAA Circuit 400. Such access may be a write data access, a read data access, a control access or another type of access.

Thus, after the DAA Circuit 400 initially sets the count down timer at step 702, the DAA Circuit 400 counts down the count down timer 410 (step 704). Whenever the modem software 412 accesses the DAA Circuit 400 (step 708), the DAA Circuit 400 resets the value of the count down timer (step 710). From step 710, operation returns to step 704. If the modem software 412 fails to access the DAA Circuit 400 before the count down timer reaches a termination value, e.g., zero (step 706), the DAA Circuit 400 terminates the call via operation at step 514 by transitioning to the on-hook state. From step 514, operation ends.

Figure 8:
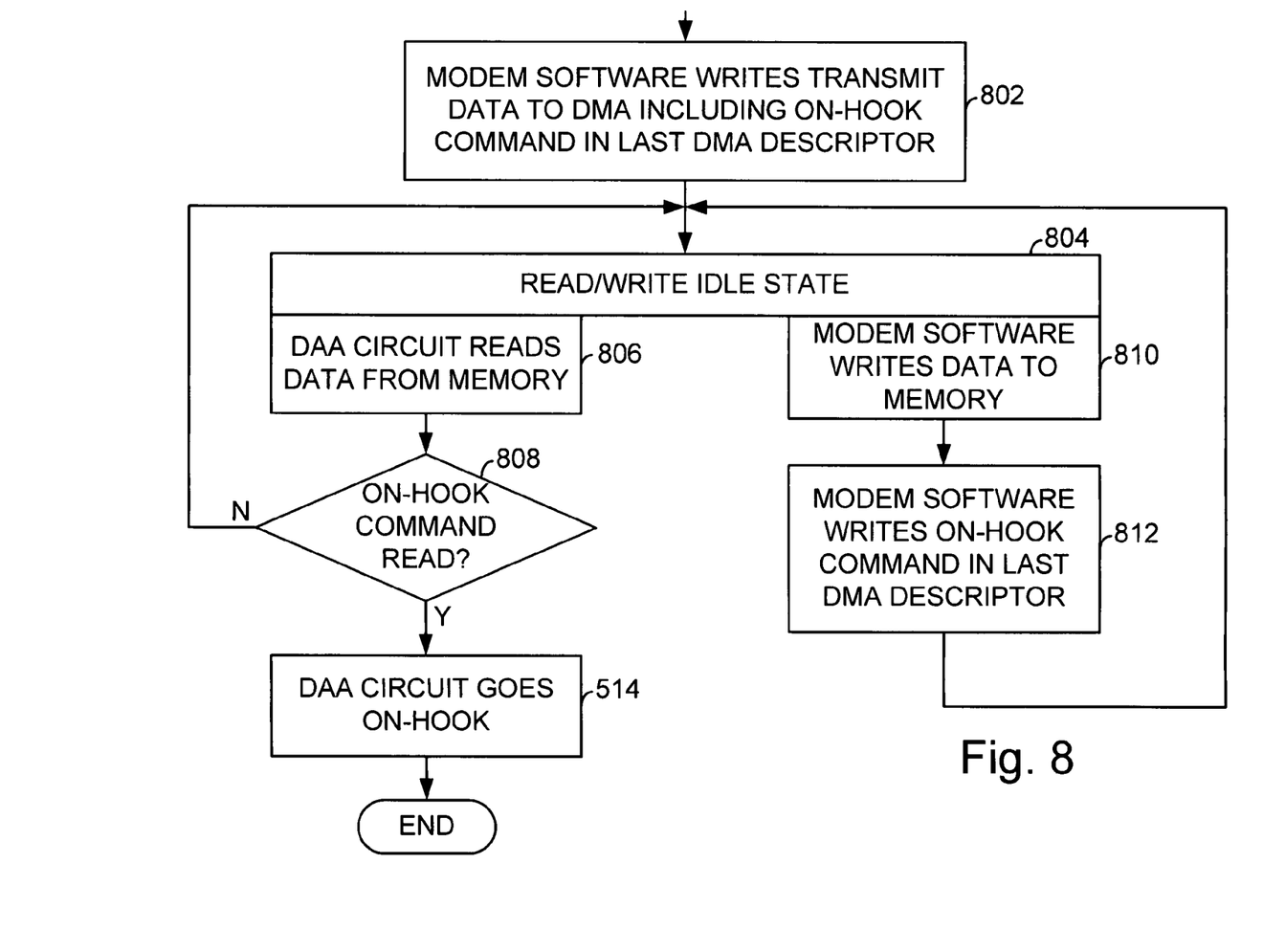
FIG. 8 is a logic diagram illustrating specific operations according to a third embodiment of the present invention.

FIG. 8 is a logic diagram illustrating specific operations according to a third embodiment of the present invention. The third embodiment of the present invention operates by monitoring the modem software's 412 data writing activity to DMA memory 416. In the third embodiment, the DMA engine 406 (of DAA Circuit 400 of FIG. 4A) directly accesses DMA memory 416 of the memory 318 to retrieve transmit data. The modem software 412 also accesses the DMA memory 416 of the memory 318 to write the transmit data in the DMA memory 416. When the modem software 412 fails to access the DMA memory 416 and to write new transmit data after a period of time, the DAA Circuit 400 determines that the modem software 412 is nonfunctional with respect to the data communication and transitions to the on-hook state.

Figure 9:
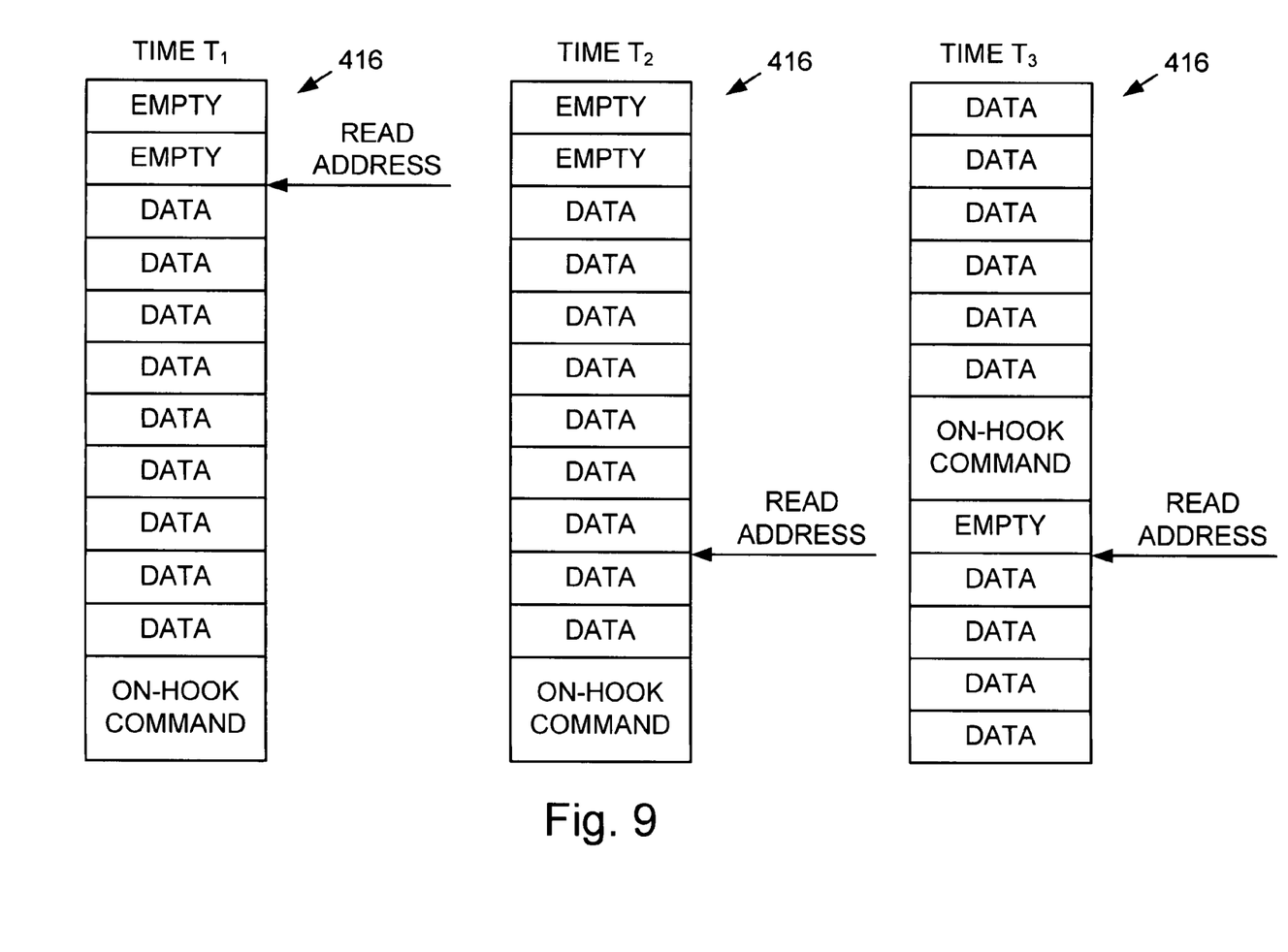
FIG. 9 is a block diagram illustrating Direct Memory Access contents that are operated upon according to the third embodiment of the present invention.

FIG. 9 is a block diagram illustrating DMA memory 416 contents that are operated upon according to the third embodiment of the present invention. When operation according to the third embodiment commences, the modem software 412 writes transmit data to the DMA memory 416. This data write includes a plurality of transmit data units and an on-hook command as the last component of the write operation. For example, referring to FIG. 9, at time $T_1$ the modem software 412 writes data to the DMA memory 418 that includes a plurality of data units and an on-hook command as the last DMA descriptor. The DMA engine 406 reads DMA descriptors at a READ ADDRESS location. The READ ADDRESS location increments in the DMA memory 418 until it reaches a last DMA memory 418 address and then it will circularly moves to the top memory address of the DMA memory 416, i.e., a circular buffer.

Referring again to FIG. 8, at step 802, the modem software 412 first writes transmit data and an on-hook command to DMA memory 416 (the status of DMA memory 416 at time $T_1$). After the initial DMA memory 416 write by the modem software 412, operation proceeds to a read/write idle state (step 804) where data is neither being written to DMA memory 416 nor being read from DMA memory 416.

When the DAA Circuit 400 of the DAA Circuit 400 requires additional data to transmit, the DMA engine 406 reads additional data from the DMA memory 416 (step 806) and buffers the data in the data buffer 404. For each data unit read by the DMA engine 406 from DMA memory 416, the DAA Circuit 400 determines whether the data unit read includes an on-hook command (step 808). If the data unit read does not include an on-hook command, operation returns to step 804. However, if the data unit read includes an on-hook command, the DAA Circuit 400 terminates the call at step 514 by transitioning to the on-hook state.

The modem software 412 also accesses the DMA memory 416 to write transmit data to the DMA memory 416. During normal operation, the modem software 412 writes data to memory (step 810). After writing data to memory, the modem software 412 then writes an on-hook command in the last DMA descriptor written to the DMA memory 416 in the current write operation (step 812). From step 812, operation proceeds again to step 804. During normal operation, the modem software 412 accesses the DMA memory 416 periodically and writes sufficient transmit data so that the on-hook command will not be read by the DMA engine 406 during its read cycle.

Referring again to FIG. 9, at time $T_2$ the DMA engine 406 has just completed a read cycle in which it read a plurality of data units from the DMA memory 416. During this read cycle, the READ ADDRESS did not reach the on-hook command that was written in DMA memory 416 during the last write cycle of the modem software 412. Referring now to time $T_3$ of FIG. 9, the modem software 412 has just finished another write cycle in which it wrote additional transmit data to the DMA memory 416 and an on-hook command in DMA memory 416 immediately after the last data unit location. Thus, in this case, the READ ADDRESS of the DMA engine 406 established at time $T_2$ remains the same at time $T_3$. However, additional data units were written to the DMA memory 416 between time $T_2$ and $T_3$ so that the on-hook command is now resident in a different location within the DMA memory 416. Thus, the DMA engine 406 must cycle through the bottom of the circular DMA memory 416 and again to the top and to the middle of the DMA memory 416 before reading the on-hook command.

Should the modem software 412 write transmit data and a new on-hook command in the DMA memory 416 prior to the DMA engine 406 accessing the on-hook command, operation will continue and the DAA Circuit 400 determines that the modem software 412 still functions properly. However, should the modem software 412 cease writing transmit data to the DMA memory 416 and the DMA engine 406 access the on-hook command, the DAA Circuit 400 will execute the on-hook command to terminate the call.

In a variation of the third embodiment, the DMA memory 416 is a linear buffer and the modem software 412 writes an on-hook command in the last location of the DMA memory 416. During normal operation, the modem software 412 periodically writes transmit data to the DMA memory 416 and, at that time, sets the READ ADDRESS to an appropriate address. During normal read cycles, the DMA engine 406 does not read from the last location of the DMA memory 416. However, when the modem software 412 fails to write new transmit data to the DMA memory 416, the DMA engine 406 will read from the last location of the DMA memory 416 and, resultantly, the DAA Circuit 400 will execute the on-hook command and release the telephone line.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for preventing a modem from blocking a telephone line, the method comprising:
   establishing, by modem circuitry and modem software of the modem, a communication across the telephone line with a remote modem;
   servicing, by the modem, the communication across the telephone line with the remote modem; and
   detecting, by the modem circuitry of the modem, that the modem software has become nonfunctional with respect to the communication by:
      writing transmit data and an on-hook command to memory wherein each time the modem software writes transmit data, the modem software overwrites a previously written on-hook command with transmit data and writes a new on-hook command immediately following currently written transmit data;
      determining that the modem software has become nonfunctional when the modem circuitry reads the on-hook command from memory; and
      releasing, by the modem circuitry, the telephone line when it determines that the modem software has become nonfunctional with respect to the communication.

2. The method of claim 1, wherein the modem software is executed by a device that is selected from the group consisting of at least a digital computer, a modem card, an external modem, a FAX machine, and a set top box.

3. The method of claim 1, wherein:
   the modem circuitry resides on a peripheral component; and
   the modem software is executed by a host component.

4. The method of claim 1, wherein detecting by the modem circuitry that the modem software has become nonfunctional with respect to the communication further comprises:
   altering a countdown timer of the modem circuitry upon access of the modem circuitry by the modem software; and
   determining that the modem software has become nonfunctional when the countdown timer reaches a termination value.

5. The method of claim 4, wherein the modem circuitry resets the countdown timer when the modem software accesses the modem circuitry.

6. The method of claim 4, wherein the modem software resets the countdown timer when the modem software accesses the modem circuitry.

7. The method of claim 4, wherein:
   the countdown timer is reset each time that the modem software writes data to the modem circuitry; and
   the countdown timer is reset each time that the modem software reads data from the modem circuitry.

8. The method of claim 1, further comprising reading the transmit data from the DMA memory by the modem circuitry.

9. The method of claim 1, wherein the modem circuitry detects that the modem software has become nonfunctional with respect to the communication when the modem software fails to access the modem circuitry after a period of time.

10. A modem comprising:
    modem software that is executed by a processor;
    modem circuitry communicatively coupled to the modem software, the modem circuitry also communicatively coupled to a telephone line; and
    wherein the modem circuitry:
       establishes a communication with a remote modem across the telephone line;
       services the communication with the remote modem in cooperation with the modem software;
       detects that the modem software has become nonfunctional with respect to the communication by:
          writing data to memory whenever data is received and by writing a specified data in a memory location immediately after memory locations containing the data;
          overwriting the previously written specified data with new data and a new specified data immediately following the new data whenever new data is received by the modem circuitry; and
          reading the specified data in the memory location; and
       releases the telephone line when it determines that the modem software has become nonfunctional with respect to the communication.

11. The modem of claim 10, wherein the processor is resident within a host device that is selected from the group consisting of at least a digital computer, a modem card, an external modem, a FAX machine, and a set top box.

12. The modem of claim 10, wherein:
    the modem circuitry resides on a peripheral component; and
    the modem software is executed by a host component.

13. The modem of claim 10:
    further comprising a countdown timer;
    wherein the countdown timer is set to an initial value upon access of the modem circuitry by the modem software; and
    wherein the modem circuitry determines that the modem software has become nonfunctional when the countdown timer reaches a termination value.

14. The modem of claim 13, wherein the countdown timer is reset each time that the modem software accesses the modem circuitry.

15. The modem of claim 13, wherein the countdown timer is reset each time that the modem software writes data to or reads data from the modem circuitry.

16. The modem of claim 10:
    wherein the modem circuitry further comprises a Direct Memory Access (DMA) engine that accesses a DMA memory of the a device;
    wherein the modem software writes transmit data and an on-hook command to the DMA memory;
    wherein the DMA engine of the modem circuitry reads transmit data from the DMA memory; and
    wherein the modem circuitry determines that the modem software has become nonfunctional when the DMA engine of the modem circuitry reads the on-hook command from DMA memory.

17. The modem of claim 10 wherein the specified data comprises an on-hook command.

18. A method for preventing a modem from blocking a telephone line comprising:
    establishing, by modem circuitry and modem software of the modem, a communication across the telephone line with a remote modem;
    servicing, by the modem circuitry and modem software of the modem, the communication across the telephone line with the remote modem;
    altering a countdown timer upon each access of the modem circuitry by the modem software;

writing data to memory whenever data is received and by writing a specified data in a memory location immediately after memory locations containing the data;

overwriting the previously written specified data with new data and a new specified data immediately following the new data whenever new data is received by the modem;

determining, by the modem circuitry, that the modem software has become nonfunctional when the countdown timer reaches a termination value or when the specified data in the memory location is read; and releasing, by the modem circuitry, the telephone line when it determines that the modem software has become nonfunctional with respect to the communication.

19. The method of claim 18, wherein the modem circuitry resets the countdown timer:

each time that the modem software writes data to the modem circuitry; and each time that the modem software reads data from the modem circuitry.

20. The method of claim 18, wherein the modem software resets the countdown time:

each time that it writes data to the modem circuitry; and each time that it reads data from the modem circuitry.

21. The method of claim 18, further comprising:

writing transmit data and an on-hook command to Direct Memory Access (DMA) memory by the modem software;

reading the transmit data from the DMA memory by the modem circuitry; and determining that the modem software has become nonfunctional when the modem circuitry reads the on-hook command from DMA memory.

22. The method of claim 21, wherein each time that the modem software writes transmit data to the DMA memory, the modem software overwrites a previously written on-hook command with transmit data and writes a new on-hook command immediately following currently written transmit data.

* * * * *

UNITED STATES PATENT AND TRADEMARK OFFICE
CERTIFICATE OF CORRECTION

| | | |
|---|---|---|
| PATENT NO. | : 7,738,652 B2 | Page 1 of 1 |
| APPLICATION NO. | : 11/386364 | |
| DATED | : June 15, 2010 | |
| INVENTOR(S) | : Mark Gonikberg | |

It is certified that error appears in the above-identified patent and that said Letters Patent is hereby corrected as shown below:

Column 12, line 46 in Claim 16: after "memory of the" delete "a"

Signed and Sealed this
Thirteenth Day of March, 2012

David J. Kappos
*Director of the United States Patent and Trademark Office*